United States Patent Office 3,011,397
Patented Dec. 5, 1961

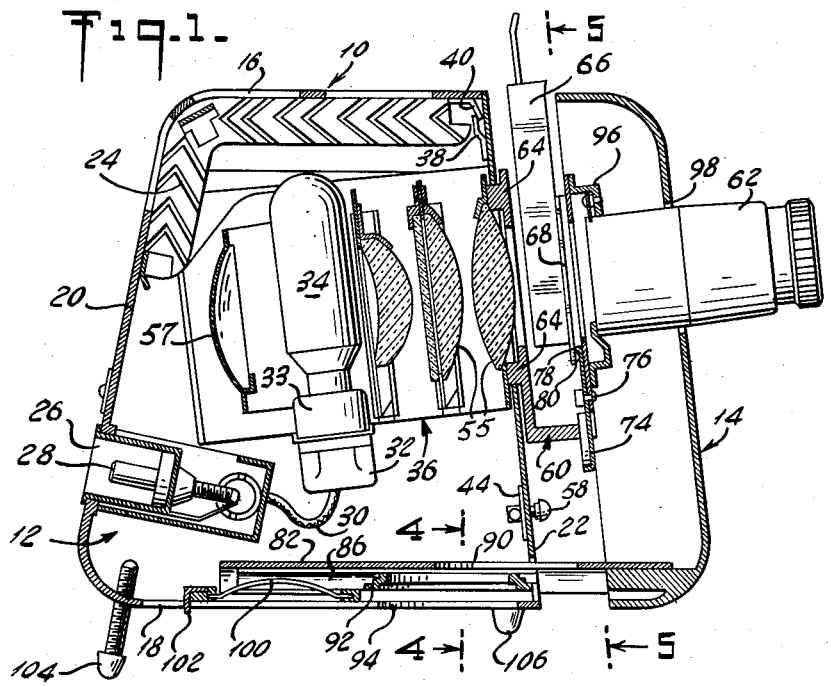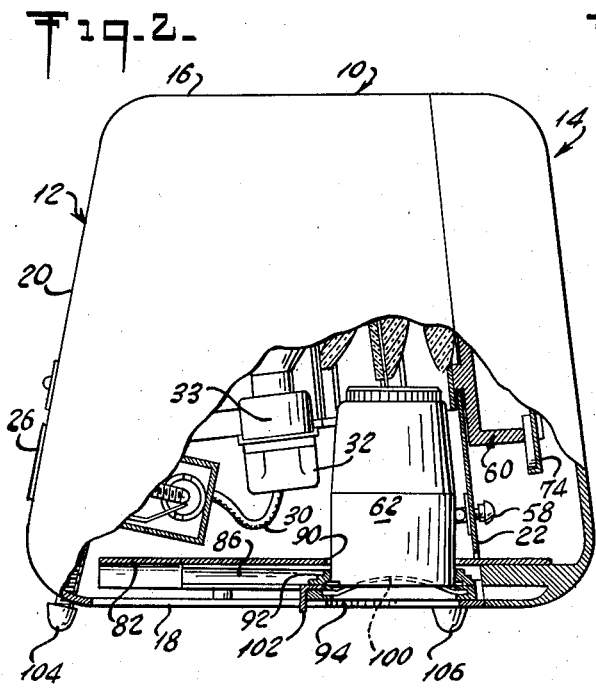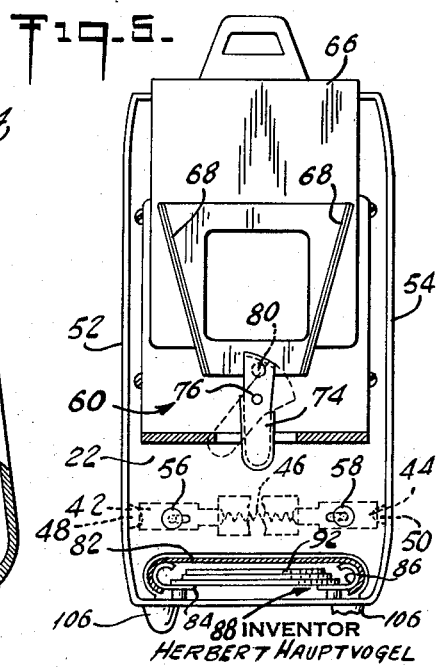

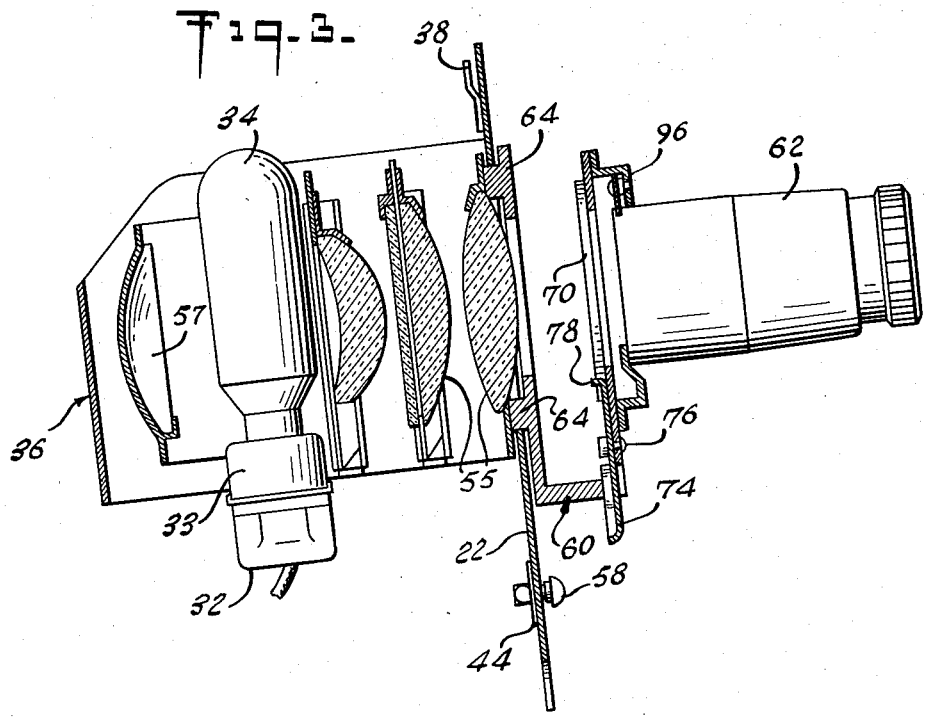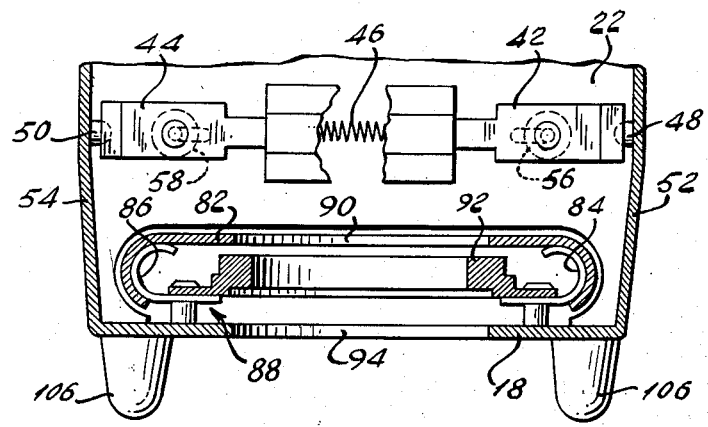

3,011,397
SMALL-SIZE PROJECTOR
Herbert Hauptvogel, Dresden, Germany, assignor to VEB Kamera- und Kinowerke Dresden
Filed Jan. 8, 1959, Ser. No. 785,637
7 Claims. (Cl. 88—26)

This invention relates in general to film or slide projectors and in particular to a new and useful small-size projector including a compact case having a forward wall which is detachable for the removal of the complete projecting system including the slide holder from the case.

Some types of prior art constructions include projectors which are secured to their associated carrying case but such devices are usually very large and include separate housing members for the associated projector lamp and light focusing lens. Such units are expensive because they require an additional case or cover to cover the complete projector system as well as separate housing space for the associated projector elements.

In accordance with the present invention there is provided a small-size projector and projector case combination including a front mounting wall which holds the complete projector system elements in their associated positions within the case. The device includes a storage space for the projecting lens tube, the latter being easily removed when the device is in a non-operative state. The complete mechanism includes a cover piece which is slidable onto the projector housing portion of the case to completely close the case and give it a clean uncluttered appearance without any projecting parts. An advantage of the invention is that the complete projecting unit including the holder for slides is removable from the projector housing portion of the case for inspection or cleaning purposes or use at a separate location as desired. The forward wall of the projector housing portion of the case supports the projector system and forms a partition and is mounted by means of a resilient locking device that can be easily manipulated to detach the wall from the case. The complete case includes a forward cover member which is mounted on the projector housing portion of the case and is slidable on the side walls into a complementary position to completely seal the case. The projecting lens tube is detachable and can be inserted into the closed projector case in a position to secure the sliding cover member against being pulled out.

A feature of the invention is the provision of a simple locking device for holding the projector lens within the case and wherein the tube retains the slide box cover member against accidental loosening.

Accordingly, it is an object of this invention to provide a portable projector unit.

A further object of this invention is to provide a small-size projector including a projector case having a portion for housing the projector elements and including a detachable front wall upon which the projector elements are mounted.

A further object of the invention is to provide a portable projector and case combination including means for removing the projector lens tube and sliding a front cover member over the projector housing portion of the case to cover and seal the case.

A further object of the invention is to provide a projector and case unit which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:
FIG. 1 is a somewhat schematic transverse sectional view indicating a combination projector and carrying case constructed in accordance with the invention;

FIG. 2 is a side elevation, partly broken away of the projecting unit indicated in FIG. 1 but showing the lens tube removed and positioned within the projector housing portion of the case and with the cover in a closed position;

FIG. 3 is a partly elevational and partly sectional view of the complete projecting unit including the slide carrier constructed in accordance with the invention;

FIG. 4 is a fragmentary vertical section taken on the line 4—4 of FIG. 1; and

FIG. 5 is a vertical section taken on the line 5—5 of FIG. 1.

Referring to the drawings in particular, the invention as embodied therein includes a projector case generally designated 10, including a projector housing portion generally designated 12 and a forward detachable cover member generally designated 14. The projector housing portion 12 includes a top-wall 16 and a bottom wall 18 parallel thereto, an inclined rear wall 20 and an inclined front wall 22 which converge toward the top wall 16.

The projector housing portion is provided with a plurality of slots 24 along the rear wall 20 and the top wall 16 to vent the unit and prevent overheating.

The rear wall 20 is cut away to receive an electrical socket member 26 having male pronged terminals 28 adapted to receive a female plug for connection to a suitable source of electrical power. The electrical socket 26 is provided with a short length of electrical wire 30 terminating in a plug 32 which is adapted to be fitted into a socket member 33 for lighting a projector lamp 34 of a complete projector assembly generally designated 36.

In accordance with the invention, the front wall 22 is provided with an annular opening through which the projector assembly extends. The wall 22 provides a combination mounting plate and partition wall for the device. For this purpose, the upper end of the partition wall is provided with lugs 38 which easily fit behind projections 40 secured to the upper wall 16 of the projector housing portion 12. The lower portion of the wall 22 is provided with a pair of slide noses 42 and 44 (FIGS. 4, 5) which are biased outwardly, oppositely extending directions by a compression spring 46 into latching engagement with projections 48 and 50 (FIG. 4) located on side walls 52 and 54, respectively, of the projector housing portion 12. The complete wall 22 with the associated projector assembly 36 may be removed from the projector housing portion 12 by moving handles 56 and 58 secured to respective noses 42 and 44 inwardly against the force of the compression spring 46. The projector assembly 36 includes the entire illuminating system including the lamp 34, a reflector 57, a light focusing lens system 55, a slide carrier generally designated 60 and a removable tubular projecting lens system 62.

The slide carrier 60 includes an annular channel-shaped mounting member 64 which is rotatably mounted in the wall 22. The slide carrier includes a pair of spaced walls shaped to receive a slide-changing and holding box 66. The slide carrier is provided with two guide rails 68 (see FIG. 5) and corresponding opposite counter rails 70 (FIG. 3) which converge in pairs toward the plane of symmetry. This construction makes it possible to direct the box 66 to the wall of the slide carrier 60 and permit it to be lowered without guidance in order to position it in the proper location for projecting the slide therein. The box 66 clamps in the slide carrier 60 automatically so that a sufficient firm joint is insured between the box and the slide carrier.

In view of the fact that, when the slide carrier 60 turns in its bearing 64 about the optical axis, the box 66 might move in a position which would result in an accidental loosening of the mounting, a simple locking device is provided to prevent its loosening. A lever 74 is pivotally mounted on a pin 76 affixed to the front portion of the carrier 60. The lever 74 has a bent lug portion 78 which engages an upstanding button 80 arranged on the lower part of the box 68. The lug 78 is so shaped that it acts on the button 80 like a wedge thus pulling the box 66 into the guide rails 68 and 70 when the lever 74 is turned counter-clockwise (FIG. 5).

The interior bottom portion of the cover member 14 is provided with a substantially U-shaped elongated plate or guide rail 82 having side legs bent in a substantially semicircle at both sides. The projector housing portion 12 is provided with complementary upstanding semi-circular side rails 84 and 86 forming a part of an upstanding bracket 88. The guide rails are formed by a very simple method as, for example, by stamping and bending. The guide rails 84 and 86 form complementary telescoping receiving portions for the U-shaped plate 82 affixed to the cover member 14. Thus the cover member 14 is slidable outwards on the rails to open the case and may be slid back into the same to completely close the case.

The U-shaped plate or guide rail 82 is provided with an aperture 90 (FIGS. 1 and 2) which is adapted to receive the projector lens tube 62 when it is removed from the slide carrier 60. For this purpose, the interior lamp case is provided with a socket 92 which aligns with the aperture 90 when the housing 12 is completely closed. In the closed position, the aperture 90 also aligns with an opening 94 in the bottom wall 18. The projector lens tube 62 may be removed from the slide carrier 60 by unscrewing it from a mounting 96 and it may be inserted upwardly through the aperture 94, the socket 92 and through the aperture 90 when the cover member 14 is closed. In this position, the lens tube 62 also locks the cover against accidental loosening. A holding slide 100 having a depending handle 102 is slid to the right (FIG. 1) to lock the tube 62 in place. In the embodiment indicated in the drawings, the cover member 14 is provided with a front aperture 98 to allow free passage of the projector lens tube 62. The opening 98 is relatively small and does not expose the projector parts to the exterior of the case to any degree. A suitable cap (not shown) may be provided to close the opening 98 when the tube 62 is removed.

The operation of the small-size projector is as follows:

After pushing aside the holding slide 100 to the left (FIG. 1), the projector lens tube 62 may be removed from the socket 92 through the opening 94 and inserted in position on the mount 96 of the slide carrier 60. The cover 14 is then pulled out far enough to permit easy insertion of the box 66 within the slide carrier 60. The box 66 is held in place by the blocking lever 74. The projector in this position is ready for operation and the angle for projection is adjusted by two adjustable screw legs 104, located on each side of the rear end of the bottom wall 18. The forward end of tthe bottom wall 18 is supported by a set of non-adjustable legs 106 located on each side of the case. The slide carrier 60 is pivotally mounted in a known member on the supporting plate 22 by the bearing ring 64, so that it is possible to change from an upright to a horizontal position for projecting images. However, before the cover member 14 is inserted into the projector housing portion 12, the slide carrier 60 including the box 66 is turned back to its original vertical position as indicated in FIG. 1.

If any difficulty with the apparatus should develop during the performance, the trouble can be checked without in a few seconds by removing the partition wall 22 with the complete projector assembly 36 thereon. This may be easily accomplished by disconnecting the light cable 30 and pulling the two handles 56 and 58 together to unlock the wall 22. The entire wall 22 with the projector assembly 36 can be removed from the projector housing portion 12 in this manner. After repairing the damage, the wall 22 and the entire assembly 36 may be returned again to its position in the front of the case, and operation can be continued.

While a specific embodiment of the invention has been shown and described in detail to illustrate the application of the invention principles, it will be understood that the invention may be embodied otherwise without departing from such principles.

What is claimed is:

1. A projector comprising a substantially block-shaped case; said case having a detachable front wall, a port in said wall, a cover member removably connected to and normally closing said case, and having an opening therein, a socket and an aperture formed in said case in alignment with said socket; a complete projector system including a light source, a slide holder, means for directing light from said light source to the area of said slide holder for projection, supporting means for said projector system attached to said port and permitting rotation of said projector system thereon, and a detachable lens tube connected to said slide holder; said lens tube extending through said opening outwardly from said slide holder beyond said case; said aperture and said socket being large enough to accommodate said lens tube for storage therein; and means to detach said front wall.

2. A projector according to claim 1, including means to lock said lens tube in said case.

3. A projector according to claim 2, wherein said cover member is mounted on guide rails in said case, said guide rails having a cut-out portion to accommodate said lens tube whereby when said lens tube is positioned in said case, said cover member is locked against opening thereby.

4. A projector comprising a substantially block-shaped case; said case having a detachable front wall, a port in said wall and a cover member connected to said case and having an opening therein; a complete projector system including a light source, a slide holder, means for directing light from said light source to the area of said slide holder for projection, supporting means for said projector system attached to said port and permitting rotation of said projector system thereon, and a detachable lens tube connected to said slide holder, said lens tube extending through said opening outwardly from said slide holder beyond said case; means to detach said front wall; and means for locking a slide box in said slide holder, said slide box being adapted for consecutive insertion, projection and removal of projection slides.

5. A projector comprising a substantially block-shaped hollow case; said case having a detachable front wall, a complete projector system including a light source, a slide holder spaced from said light source and means for directing light from said light source to the area of said slide holder and for projecting the image of a slide in said holder, all supported on said front wall with the light source and associated portions extending into said case, and a projecting lens portion extending outwardly from said front wall; said case including guide rail means, and a cover member comprising an upstanding portion coextensive with said front wall and normally closing said wall, further comprising an opening to permit said projector lens portion to extend therethrough, and a portion cooperating with said guide rail means in said case to permit said upstanding portion to be moved toward and away from said front wall; said portion of the cover member which cooperates with said guide rail means and said case each including open portions which are aligned when said cover member is in a closed position substantially flush with said front wall of the case; said projector lens portion being removable and insertable in said open portion of the case and through said open portion of the cover member to lock said cover member in a closed position.

6. A projector comprising a substantially block-shaped hollow case; said case having a detachable front wall; a complete projector system including a light source, a slide holder spaced from said light source and means for directing light from said light source to the area of said slide holder and for projecting the image of a slide in said holder, all supported on said front wall with the light source and associated portions extending into said case, and a projector lens portion extending outwardly from said front wall; said case including an outstanding latching projection adjacent the inside face of said front wall; said front wall including a latching pin member biased outwardly beyond a side wall of said case and engageable with said latching projection to hold said front wall in position on said case; handle means to move said latching pin against the biasing force to permit unlatching of said front wall; said case including guide rail means, and a cover member comprising an upstanding portion coextensive with said front wall and normally closing said wall, further comprising an opening to permit said projector lens portion to extend therethrough, and a portion cooperating wtih said guide rail means in said case to permit said upstanding porion to be moved toward and away from said front wall.

7. A small-size projector comprising a substantially block-shaped case having a detachable front cover member, an intermediate wall within said case, a projector system secured to said intermediate wall, said case including an outstanding latching projection adjacent the inside face of said intermediate wall, said wall including a latching pin member biased outwardly beyond a side wall of said case and engageable with said latching projection to hold said wall in position in said case substantially parallel to said front cover member, and handle means to move said latching pin against the biasing force to permit unlatching of said intermediate wall.

References Cited in the file of this patent

UNITED STATES PATENTS

| | | |
|---|---|---|
| 2,033,038 | Lee | Mar. 3, 1936 |
| 2,439,987 | Roger | Apr. 20, 1948 |
| 2,506,168 | Perillo | May 2, 1950 |
| 2,510,374 | Brady | June 6, 1950 |
| 2,512,314 | Dutton | June 20, 1950 |
| 2,573,088 | Zillmer | Oct. 30, 1951 |
| 2,712,266 | Cherouvrier | July 5, 1955 |

FOREIGN PATENTS

| | | |
|---|---|---|
| 64,444 | France | June 8, 1955 |